(12) United States Patent
Rossignol

(10) Patent No.: US 6,353,646 B1
(45) Date of Patent: Mar. 5, 2002

(54) DIGITAL COMPARATOR

(75) Inventor: Stéphane Rossignol, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/281,675

(22) Filed: Mar. 30, 1999

(30) Foreign Application Priority Data

Mar. 31, 1998 (FR) .......................................... 98 04205

(51) Int. Cl.$^7$ ................................................. H03D 3/24
(52) U.S. Cl. ...................... 375/375; 340/146.2; 708/671
(58) Field of Search ........................... 375/375; 327/74, 327/1, 76; 340/146.2; 708/671

(56) References Cited

U.S. PATENT DOCUMENTS

| | | | | |
|---|---|---|---|---|
| 4,450,432 A | | 5/1984 | Schmidtpott et al. .... | 340/146.2 |
| 4,760,374 A | | 7/1988 | Moller ..................... | 340/146.2 |
| 5,146,592 A | * | 9/1992 | Pfeiffer et al. .............. | 345/545 |
| 5,260,680 A | * | 11/1993 | Glass ....................... | 340/146.2 |

FOREIGN PATENT DOCUMENTS

| DE | A-38 25 388 | 2/1990 | ............. G06F/7/02 |
|---|---|---|---|

OTHER PUBLICATIONS

French Search Report from French Patent Application 98/04205, filed Mar. 31, 1998.
Patent Abstracts of Japan, vol. 014, No. 226 (P-1047), May 14, 1990 & JP-A-02 054333 (Mitsubishi Electric Corp.).

* cited by examiner

*Primary Examiner*—Don N. Vo
(74) *Attorney, Agent, or Firm*—Wolf, Greenfield & Sacks, P.C.; James H. Morris

(57) ABSTRACT

The present invention relates to a digital comparator including a first block receiving on first inputs the bits of a first operand A of n bits and on second inputs the logic complements of the bits of a second operand B of n bits, generating a propagation signal $$p_n = \prod_{i=1}^{n} P_i \quad \text{where } P_i = A_i + \overline{B}_i,$$

and a generation signal $$g_n = \sum_{i=1}^{n-1}\left(G_i \prod_{j=i+1}^{n} P_j\right) + G_n \quad \text{where } G_i = A_i \cdot \overline{B}_i, \quad g_1 = G_1,$$

a second block receiving on a first input the most significant bit $A_n$ of the first operand, on a second input the logic complement $\overline{B}_n$ of the most significant bit $B_n$ of the second operand, on a third input propagation signal $P_n$, on a fourth input generation signal $g_n$, generating signals $C_n$ and $S_{n+1}$ such that $C_n = p_n + g_n$ and $S_{n+1} = (p_n + g_n) \oplus A_n \oplus \overline{B}_n$, where sign $\oplus$ represents operation X-OR, and also including a third block receiving on a first input signal $p_n$ and on a second input signal $g_n$, and generating a signal E such that $E = p_n \cdot \overline{g}_n$, indicating by a predetermined state that operands A and B are equal.

2 Claims, 4 Drawing Sheets

DIGITAL COMPARATOR

BACKGROUND OF THE INVENTION

1. Field of the Invention

The present invention relates to the field of digital comparators, and more specifically to a digital comparator using a carry lookahead adder.

2. Discussion of the Related Art

Many electronic circuits use numerical calculation circuits enabling in particular to compare two numbers A and B having the same number of bits.

FIG. 1 very schematically shows the structure of a conventional complete comparator, providing an indication of equality, superiority A>B, or inferiority A<B.

A first block 11 receives on a first input an operand A, on a second input an operand B, and generates an output signal indicating whether A=B. A second block 12 receives on two inputs operands A and B, performs operation A−B and generates two outputs, one corresponding to A<B, and the other corresponding to A≧B. Logic elements 13, 14 receiving the signals corresponding to A≧B and A=B determine whether A=B or whether A>B. With operation A−B corresponding, in binary coding, to operation A+$\overline{B}$+1, block 11 is conventionally an adder adding A, $\overline{B}$, and an incoming carry equal to 1.

In the following description, $A_i$ and $B_i$ will designate the n bits of operands A and B, i being included between 1 and n.

FIG. 2 shows an example of structure of block 11 of FIG. 1. An X-OR gate 21 receives on a first input bit $A_1$ of the first operand A and on a second input bit $B_1$ of the second operand B. The output of X-OR gate 21 will be at a high logic level "1" in case of an equality between bits $A_1$ and $B_1$. n X-OR gates 21 thus enable determining, rank by rank, the equality or the inequality of the bits of same rank of the first and second operands. The outputs of these X-OR gates are connected to the n inputs of an AND gate 22. The output of AND gate 22 will be at a high logic level "1" in case of a bit to bit equality of the first and second operands.

SUMMARY OF THE INVENTION

An object of the present invention is to provide a complete comparator using a reduced number of logic gates.

This objects as well as others is achieved by a digital comparator which includes a first block receiving on first inputs the bits of a first operand A of n bits and on second inputs the logic complements of the bits of a second operand B of n bits, generating a propagation signal $$p_n = \prod_{i=1}^{n} P_i \quad \text{where } P_i = A_i + \overline{B}_i,$$

and a generation signal $$g_n = \sum_{i=1}^{n-1}\left(G_i \prod_{j=i+1}^{n} P_j\right) + G_n \quad \text{where } G_i = A_i \cdot \overline{B}_i, \ g_1 = G_1,$$

which includes a second block receiving on a first input the most significant bit $A_n$ of the first operand, on a second input the logic complement $\overline{B}_n$ of the most significant bit $B_n$ of the second operand, on a third input propagation signal $P_n$, on a fourth input generation signal $g_n$, generating signals $C_n$ and $S_{n+1}$ such that $C_n=p_n+g_n$ and $S_{n+1}=(p_n+g_n)\oplus A_n \oplus \overline{B}_n$, where sign $\oplus$ represents operation X-OR, and which also includes a third block receiving on a first input signal $p_n$ and on a second input signal $g_n$, and generating a signal E such that E=$p_n \cdot \overline{g_n}$, indicating by a predetermined state that operands A and B are equal.

According to another aspect of the present invention, the first and second blocks both belong to a carry lookahead adder, the first block belonging to a block of the adder used to calculate all propagation signals $p_i$ and all generation signals $g_i$, where i is included between 1 and n, and the second block belonging to a block of the adder used to calculate all sum signals $S_i$, where i is included between 1 and n+1, and outgoing carry signal $C_n$, an incoming carry signal of the second block being set to 1.

The foregoing objects, features and advantages of the present invention will be discussed in detail in the following non-limiting description of specific embodiments in connection with the accompanying drawings.

DETAILED DESCRIPTION

A comparator is, as seen, conventionally formed by means of an adder calculating A+$\overline{B}$+1. The present invention provides to use a carry lookahead adder to make a comparator providing an equality indication of particularly simple structure. A carry lookahead adder has many advantages, especially as concerns the operating speed.

Figure 3:
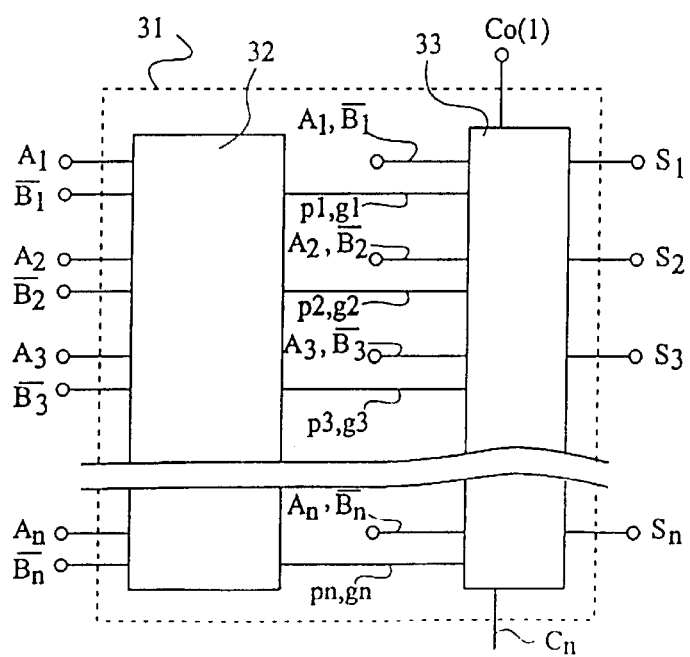
FIG. 3 very schematically shows the structure of a carry lookahead adder.

FIG. 3 shows a very simplified view of a carry lookahead adder. Adder 31 here receives the signals enabling it to calculate A+$\overline{B}$+1=S.

Adder 31 receives on a first n-bit input the n bits of first operand A and on a second n-bit input the logic complements of the n bits of second operand B. A first block 32 calculates according to the carry lookahead method n generation signals $g_1$ to $g_n$, such that:

$$g_k = \sum_{i=1}^{k-1}\left(G_i \prod_{j=i+1}^{k} P_j\right) + G_k$$

where $G_i = A_i \cdot \overline{B}_i$ k being included between 2 and n, with $g_1=G_1$; and n propagation signals $p_n$ such that:

$$p_k = \prod_{j=i+1}^{k} P_i \quad \text{where } P_i = A_i + \overline{B}_i$$

k being included between 1 and n.

A second block 33, according to the carry lookahead method, receives on a first input the n propagation signals, on a second input the n generation signals, on a third input first operand A, on a fourth input the logic complement of second operand B, and on a fifth input an incoming carry bit which is here set to 1 before performing operation A+$\overline{B}$+1. The first four inputs of block 33 are n-bit inputs. Outputs S and $C_n$ respectively correspond to the result over n bits and to the outgoing carry of this operation.

There are several different architectures of blocks 32 and 33.

Figure 4:
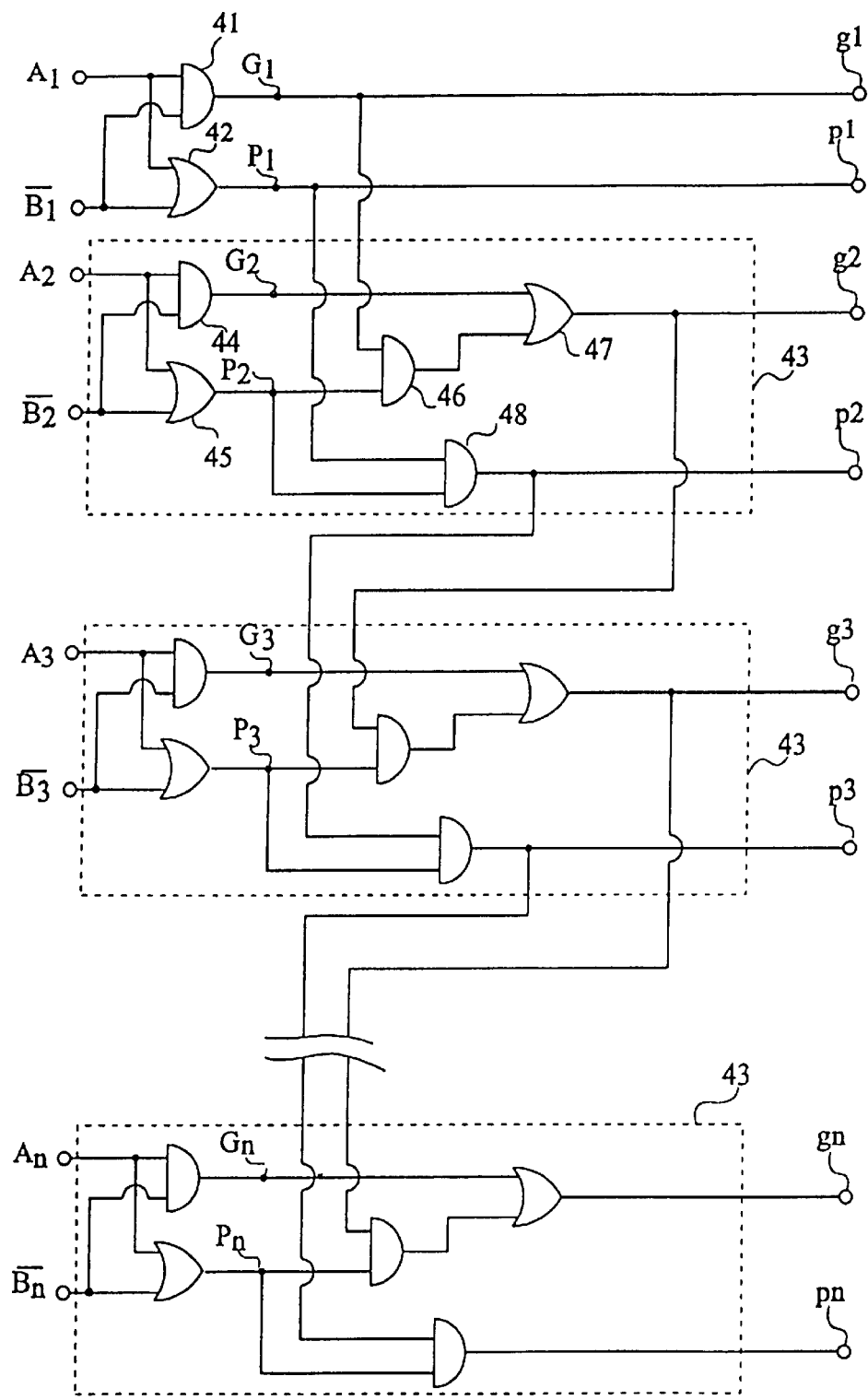
FIG. 4 shows a first portion of a carry lookahead adder.

FIG. 4 schematically shows a conventional architecture of block 32. An AND gate 41 receives on a first input a signal $A_1$ corresponding to the least significant bit of first operand A and on a second input a signal corresponding to the logic complement $\overline{B}_1$ of the least significant bit of second operand B. AND gate 41 generates a signal $G_1$ which is also equal to the least significant generation signal $g_1$. An OR gate 42 receives on a first input signal $A_1$ and on a second input signal $\overline{B}_1$. OR gate 42 generates a signal $P_1$ which also is equal to the least significant bit of propagation signal $p_1$.

A block 43 includes an AND gate 44 and an OR gate 45 which both receive a signal $A_2$ corresponding to the second least significant bit $A_2$ of first operand A and a signal $_2$ corresponding to the logic complement of the least significant bit of second operand B, and respectively generate intermediary signals $G_2$ and $P_2$. Block 43 also includes an AND gate 46 receiving on a first input intermediary signal $P_2$ and on a second input the generation signal of lowest rank $g_1$, and an OR gate 47 receiving on a first input the output of AND gate 46 and on a second input intermediary signal $G_2$. The output of OR gate 47 corresponds to generation signal $g_2$. Block 43 finally includes an AND gate 48, a first input of which receives intermediary signal $P_2$ and a second input of which receives the propagation signal of lowest rank $p_1$. The output of AND gate 48 corresponds to propagation signal $p_2$. Generation signals g of ranks 3 to n, as well as propagation signals p of ranks 3 to n, are generated by corresponding blocks 43.

Figure 5:
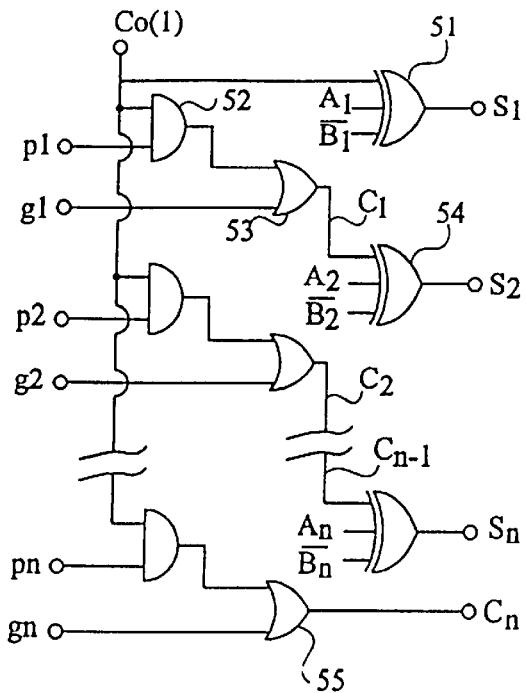
FIG. 5 shows a second portion of a carry lookahead adder.

A conventional architecture of block 33 of FIG. 3 has been shown in FIG. 5. An X-OR gate 51 receives on a first input incoming carry signal $C_0$, on a second input bit $A_1$ of rank 1 of operand A and on a second input the logic complement $\overline{B}_1$ of the bit of rank 1 of operand B. X-OR gate 51 generates bit $S_1$ of rank 1 of sum S. An AND gate 52 receives on a first input incoming carry signal $C_0$ and on a second input the propagation signal of rank 1, $p_1$.

The output of AND gate 52 is connected to a first input of an OR gate 53. A second input of OR gate 53 receives generation signal $g_1$, and the output of OR gate 53 corresponding to carry signal $C_1$. Bit $S_2$ of sum S is generated by an X-OR gate receiving on a first input the carry signal of lowest rank $C_1$, on a second input bit $A_2$ of the first operand, and on a third input the logic complement $_2$ of the bit of rank 2 of operand B. The signals C of ranks 2 to n and the bits S of ranks 3 to n are obtained similarly by corresponding gates 51, 52, and 53. Generally, $C_k = p_k \cdot C_0 + g_k$, with $C_0 = 1$, that is, $C_k = p_k + g_k$ and $S_k = C_{k-1} \oplus A_k \oplus \overline{B}_k$, where k is included between 1 and n.

Figure 1:
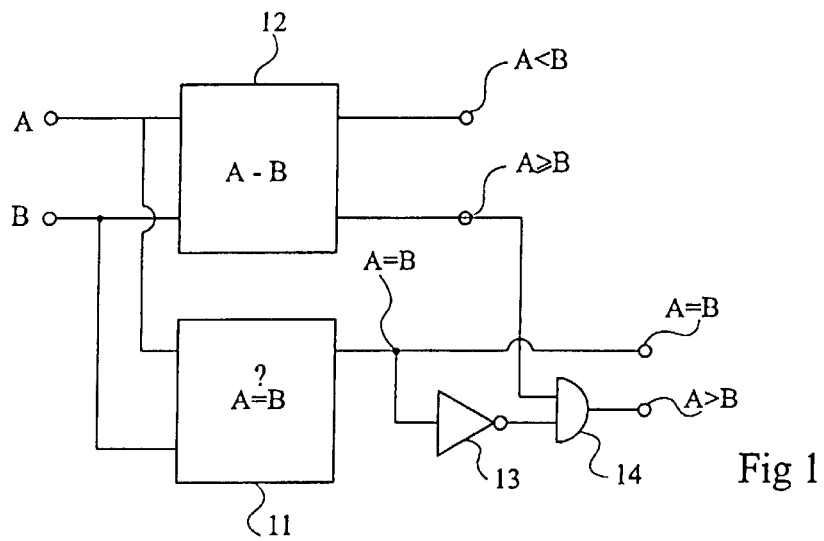
FIG. 1 very schematically shows the structure of a complete digital comparator.

It has been previously seen that block 12 of FIG. 1 determines whether first operand A is lower than or higher-than-or-equal-to second operand B. Adder 31 shown in FIG. 3 performs operation A−B but only the sign of the result S of this operation is necessary to determine whether first operand A is lower than or higher-than-or-equal-to second operand B. This result is determined in two different ways according to whether operands A and B are signed or unsigned binary numbers. If they are signed, the result is negative (A is lower than B) if bit $S_n$ of rank n of S is at "1" ($S_n$ is the sign bit of the result). It should be noted that to obtain a signed result over n bits, two operands of a maximum n−1 bits have to be added. Conventionally, bits $A_n$ and $B_n$ will then be by sign extension the same as $A_{n-1}$ and $B_{n-1}$, respectively. $S_n = C_{n-1} \oplus A_n \oplus \overline{B}_n$, but $S_n = C_{n-1} \oplus A_{n-1} \oplus \overline{B}_{n-1}$ may also be written in this case. If A and B are n-bit operands, $S_{n+1} = C_n \oplus A_n \oplus \overline{B}_n$ will have to be calculated.

If operands A and B are unsigned n-bit binary numbers, the result is negative (A is lower than B) if incoming carry $C_n$ is at "0".

Thus, for signed or unsigned n-bit operands, the adder structure can be reduced to the sole elements that enable calculation of signals $S_{n+1}$ and $C_n$. The present invention provides, based on this reduced structure, an equality indication with few additional elements.

Figure 6:
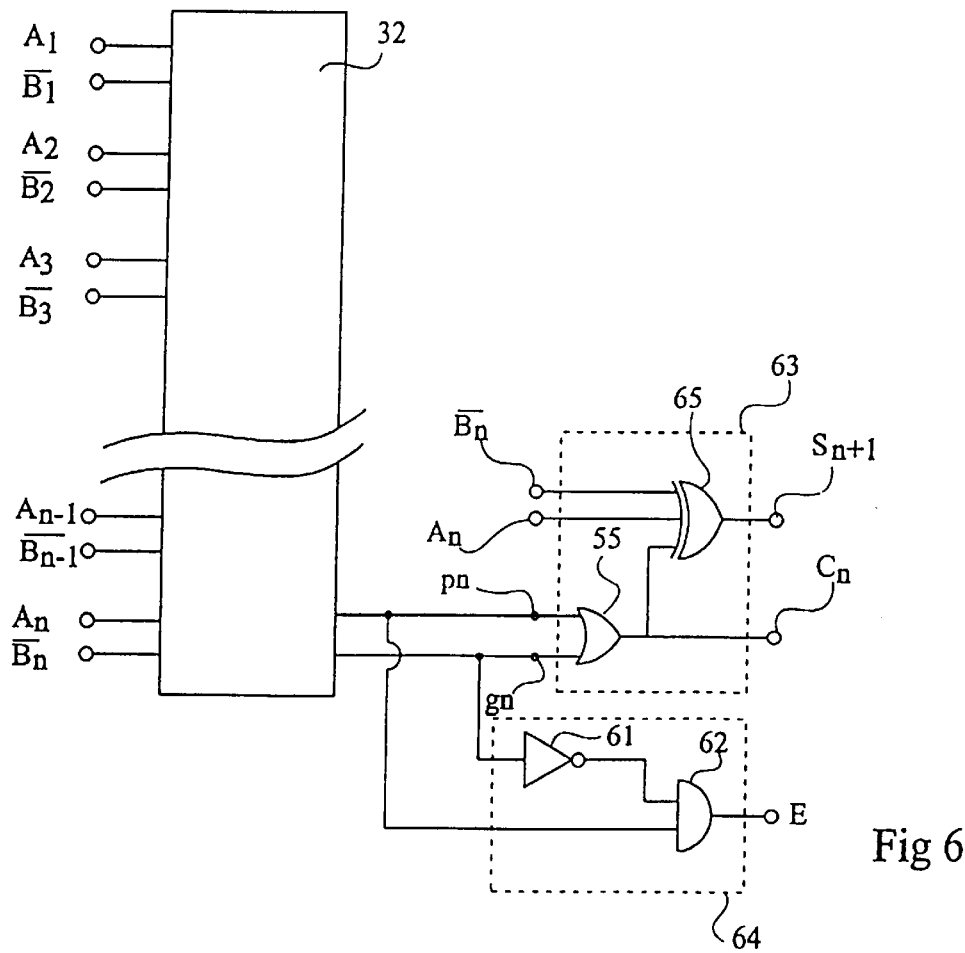
FIG. 6 schematically shows a comparator according to the present invention.

FIG. 6 very schematically shows a comparator according to the present invention. Block 32 corresponds to that of FIG. 3 but only outputs $p_n$ and $g_n$, corresponding to the propagation and generation signals of rank n, are used. Block 32 receives on a first n-bit input first operand A and on a second n-bit input the logic complement of second operand B.

A block 63 receives on a first input signal $A_n$ of rank n of first operand A, on a second input the logic complement $\overline{B}_n$ of the signal of rank n of second operand B, on a third input the propagation signal of rank n, $p_n$, and on a fourth input the generation signal of rank n, $g_n$. Block 63 includes OR gate 55 of block 33 of FIG. 5 enabling generation of carry $C_n = p_n + g_n$, and an X-OR gate 64 enabling generation of signal $S_{n+1}$ in the previously-described case where $S_{n+1} = C_n \oplus A_n \oplus \overline{B}_n$. It has been seen that signals $S_{n+1}$ and $C_n$ generated by block 63 are sufficient to determine whether operand A is lower than or higher-than-or-equal-to operand B, according to whether A and B are unsigned or not.

Now referring to the equations enabling calculation of propagation signal $p_n$, one has:

$$p_n = \prod_{i=1}^{n} P_i \quad \text{where } P_i = A_i + \overline{B}_i,$$

It should be noted that if operand A is equal to operand B, that is, whatever i included between 1 and n, $A_i = B_i$, then signal $P_i$ will always be equal to 1. Indeed, if $A_i = 0$, then $\overline{B}_i$ will be equal to 1 and conversely. Thus, if the first operand is equal to the second operand, signal $p_n$ is equal to 1. However, there are cases where signal $p_n$ is equal to 1 without operand A being equal to operand B. For example, if $A_i = 1$ and $B_i = 0$, then $P_i = 1$ and $p_n = 1$.

Similarly:

$$g_n = \sum_{i=1}^{n-1} \left( G_i \prod_{j=i+1}^{n} P_j \right) + G_n \quad \text{where } G_i = A_i \cdot \overline{B}_i$$

It should be noted that, if $A_i = B_i$ whatever i, then signal $G_i$ is null. Indeed, if $A_i = 1$, then $\overline{B}_i = 0$ and $G_i = 0$, and conversely. Thus, signal $g_n$ is null if the two operands A and B are equal bit to bit. Here again, there are cases in which $g_n$ is zero without having operands equal bit to bit. For example, if $A_i = 0$ and $B_i = 1$, then $G_i = 0$ and $g_n = 0$.

However, there are no cases in which $p_n$ is equal to 1, $g_n$ is null and the two operands are not equal bit to bit.

Figure 2:
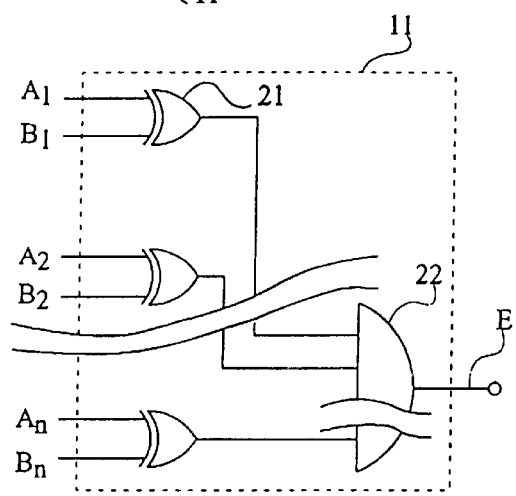
FIG. 2 very schematically shows the structure of a comparator providing an equality information.

Thus, it is enough to check that $p_n \cdot \overline{g}_n = 1$ to guarantee that A is equal to B bit to bit. Two logic elements enabling performing this calculation have been shown in FIG. 6. An inverter 61 receives $g_n$ as an input. The output of inverter 61 is connected to a first input of an AND gate 62, a second input of which receives signal $p_n$. Output E of AND gate 62 will be at 1 if the first operand A is equal to second operand B, and at 0 otherwise. Components 61 and 62 form a block 64. Block 64 has the same function as block 21 of FIG. 2 and uses an extremely reduced number of components.

Of course, the present invention is likely to have various alterations, modifications, and improvements which will readily occur to those skilled in the art. In particular, many structures enable calculating the generation signal of rank n, $g_n$, and the propagation signal of rank n, $P_n$, and all may be used according to the present invention. Similarly, the present invention has been described in FIG. 6 as adapted to a block 63 specially optimized to compare operands A and B, but it should be easily understood that the present invention may be adapted to a conventional carry lookahead adder like in FIG. 7.

Figure 7:
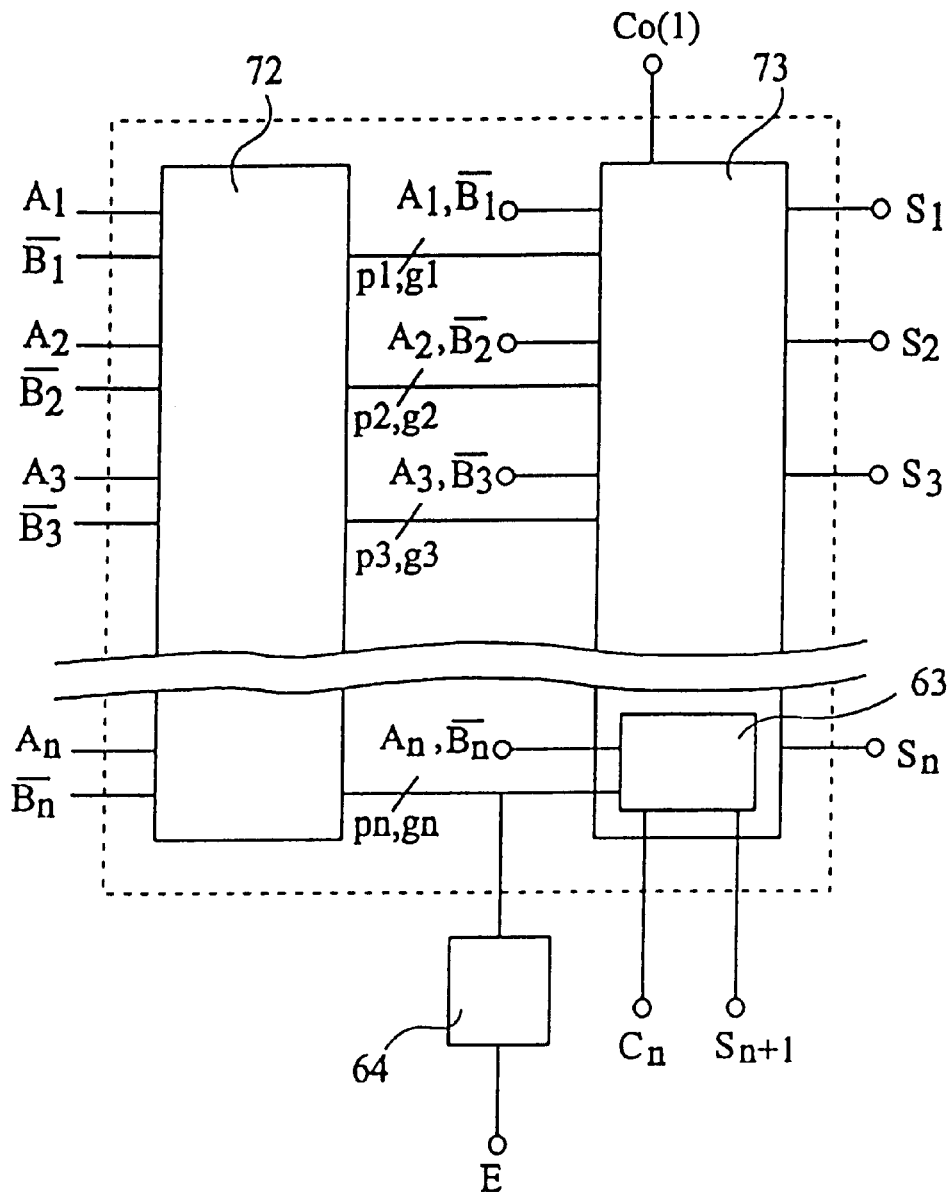
FIG. 7 schematically shows a comparator according to the present invention.

FIG. 7 shows an adaptation of the adder 31 of FIG. 3, which can at once perform conventional addition and subtraction operations, and comparison operations such as that described in relation with FIG. 6. A block 72 has the same function as block 32 of FIGS. 3 and 6, a block 73 corresponds to block 33 of FIG. 3 to which block 63 of FIG. 6 has been integrated, and block 64 has the same function in FIGS. 7 and 6. The device shown in FIG. 7 performs the same functions as blocks 11 and 12 of FIG. 1, while occupying a much smaller surface.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A digital comparator including a first block receiving on first inputs the bits of a first operand A of n bits and on second inputs the logic complements of the bits of a second operand B of n bits, generating a propagation signal $$p_n = \prod_{i=1}^{n} P_i \quad \text{where } P_i = A_i + \overline{B}_i,$$

and a generation signal $$g_n = \sum_{i=1}^{n-1} \left( G_i \prod_{j=i+1}^{n} P_j \right) + G_n \quad \text{where } G_i = A_i \cdot \overline{B}_i, \quad g_1 = G_1,$$

a second block receiving on a first input the most significant bit $A_n$ of the first operand, on a second input the logic complement $\overline{B}_n$ of the most significant bit $B_n$ of the second operand, on a third input propagation signal $P_n$, on a fourth input generation signal $g_n$, generating signals $C_n$ and $S_{n+1}$ such that $C_n = p_n + g_n$ and $S_{n+1} = (p_n + g_n) \oplus A_n \oplus \overline{B}_n$, where sign $\oplus$ represents operation X-OR, a third block receiving on a first input signal $p_n$ and on a second input signal $g_n$, and generating a signal E such that $E = p_n \cdot \overline{g}_n$, indicating by a predetermined state that operands A and B are equal.

2. The digital comparator of claim 1, wherein the first and second blocks both belong to a carry lookahead adder, the first block belonging to a block of the adder used to calculate all propagation signals $p_i$ and all generation signals $g_i$, where i is included between 1 and n, and the second block belonging to a block of the adder used to calculate all sum signals $S_i$, where i is included between 1 and n+1, and outgoing carry signal $C_n$, an incoming carry signal of the second block being set to 1.

* * * * *

UNITED STATES PATENT AND TRADEMARK OFFICE
CERTIFICATE OF CORRECTION

PATENT NO. : 6,353,646 B1
DATED : March 5, 2002
INVENTOR(S) : Stéphane Rossignol It is certified that error appears in the above-identified patent and that said Letters Patent is hereby corrected as shown below:

Column 2,
Lines 60-64, the equation should read as shown below:

$$-- \quad p_k = \prod_{i=1}^{k} P_i \text{ where } P_i = A_i + \overline{B_i} \quad --$$

Column 4,
Lines 50-54, the equation should read as shown below:

$$-- \quad g_n = \sum_{i=1}^{n-1}\left( G_i \prod_{j=i+1}^{n} P_j \right) + G_n \text{ where } G_i = A_i \bullet \overline{B_i} \quad --$$

Signed and Sealed this

Twentieth Day of August, 2002

Attest:

JAMES E. ROGAN
Attesting Officer    Director of the United States Patent and Trademark Office